United States Patent [19]
Ernst

[11] Patent Number: 5,452,938
[45] Date of Patent: Sep. 26, 1995

[54] HINGE FITTING FOR MOTOR VEHICLE SEATS

[75] Inventor: Hans-Hellmut Ernst, Ahrensburg, Germany

[73] Assignee: P. A. Rentrop, Hubert & Wagner Fahrzeugausstattungen GmbH & Co. KG, Stadthagen, Germany

[21] Appl. No.: 50,356
[22] PCT Filed: Aug. 31, 1992
[86] PCT No.: PCT/EP92/02002
    § 371 Date: May 3, 1993
    § 102(e) Date: May 3, 1993
[87] PCT Pub. No.: WO93/04891
    PCT Pub. Date: Mar. 18, 1993

[30] Foreign Application Priority Data

Sep. 5, 1991 [DE] Germany .......................... 41 29 515.3
Nov. 22, 1991 [DE] Germany .......................... 41 38 420.2

[51] Int. Cl.$^6$ ..................................................... B60N 2/22
[52] U.S. Cl. ........................................... 297/362; 475/346
[58] Field of Search ............................. 297/362; 475/346

[56] References Cited

U.S. PATENT DOCUMENTS

| 4,195,885 | 4/1980 | Lavon . | |
|---|---|---|---|
| 4,668,013 | 5/1987 | Wahlmann . | |
| 4,708,392 | 11/1987 | Werner et al. | 297/362 |
| 4,715,656 | 12/1987 | Walk et al. . | |
| 4,943,116 | 7/1990 | Ohwada et al. | 297/362 |
| 5,005,907 | 4/1991 | Caillal | 297/362 |

FOREIGN PATENT DOCUMENTS

| 0099549 | 2/1984 | European Pat. Off. . | |
|---|---|---|---|
| 2041302 | 2/1972 | Germany . | |
| 2227680 | 1/1974 | Germany . | |
| 3415929 | 10/1985 | Germany . | |
| 8705554 | 7/1987 | Germany . | |
| 3705116A1 | 9/1988 | Germany . | |
| 3941215 | 6/1991 | Germany . | |
| 4032603 | 4/1992 | Germany . | |
| 2107386 | 4/1983 | United Kingdom | 297/362 |
| 2202579 | 9/1988 | United Kingdom | 297/362 |

Primary Examiner—Peter R. Brown
Attorney, Agent, or Firm—Pollock, Vande Sande & Priddy

[57] ABSTRACT

A hinge fitting for motor vehicle seats having an adjustable backrest comprises a fixed hinge member, which is associated with the seat, and a swivelling hinge member which is associated with the backrest. The two hinge members are connected via an eccentric so as to swivel, and both hinge members comprise sets of toothing which engage with each other and form part of a wobble mechanism. The eccentric may be swivelled about a first swivelling axis in a first pivot bearing relative to the other hinge member. Both pivot bearings are arranged eccentrically relative to each other. The pivot bearings are formed by plain bearing bushings which are mounted in the hinge members. For the purpose of calibration by means of a calibrating mandrel, the plain bearing bushings are plastically compressible. The running surfaces of the plain bearing bushings observe, in each case, the smallest spacing from the associated axis of the hinge member which accommodates the respective plain bearing bushings. The hinge fitting has an only small overall width and has a high internal stability, even against high forces such as may arise during accidents. In addition, the hinge fitting has extremely small bearing clearances which are obtained with simple manufacturing methods.

11 Claims, 10 Drawing Sheets

HINGE FITTING FOR MOTOR VEHICLE SEATS

TECHNICAL FIELD

The invention relates to a hinge fitting for motor vehicle seats.

BACKGROUND OF THE INVENTION

Hinge fittings for motor vehicle seats are parts which are manufactured on an industrial scale and in numbers of several million annually. Nowadays, the assembling, in this regard, is carried out fully automatically, comprising a screening inspection, and is continued round the clock, for an optimal utilization of the machines and assembling apparatus. Under these given circumstances, a high degree of reliability must be striven for from the outset when designing a hinge fitting, such that it is possible to carry out the assembly rapidly and, above all, fully automatically and trouble-free. This high degree of reliability may be ensured relatively readily by providing suitably large positive allowances for the assembly of the individual parts. In the case of a hinge fitting for motor vehicle seats, considerable limits are, however, imposed in this regard, since the sum total of all allowances makes itself felt as a certainly considerable and unpleasant backlash at the upper edge of the backrest. Since the requirement is to keep the play of the backrest as small as possible, the designer of the hinge fitting is thus obliged to aim for the narrowest tolerances possible. Thus, in conjunction with the dependability, which is referred to as operating reliability, in the automatic manufacture of parts on an industrial scale, this results in distinctly conflicting objectives.

In a hinge fitting of the kind which is presupposed as being known for example from DE 27 24 637, the mounting of the eccentric is statically overdesigned. The statically overdesigned mounting has the drawback that a satisfactory adjustment is possible only when the backrest fitting mounting plates, which are provided on different sides of the eccentric, are arranged such that the mounting bores are accurately aligned. In industrial scale manufacture, this requirement cannot be met to the desired extent. When there are alignment errors, the swivelling axis is out-of-true, resulting in a sluggish adjustment together with a considerable reduction in comfort. To give practical effect to this construction, it is necessary that the positive mounting allowances in the two mounting bores are designed to be correspondingly large. Although this ensures the desired smooth adjusting action, it does have the drawback that an undesirably large backrest backlash must set in.

In addition, a further hinge fitting of the kind is known (DE 32 26 714 C2), in which the eccentric is mounted in a statically defined manner. Only one bearing is provided per hinge member. Loading of the backrest tends to twist the two hinge members relative to each other. The resultant forces are transferred to the swivelling axis bearing regions via the bearings. This causes a moment which brings about an out-of-true position of the axis. This out-of-true position results in canting of the bearings and in a resultant stiff adjusting action. This problem is particularly serious when the bearings are formed by steel-on-steel bearings having a grease lubrication.

Starting out from the above-mentioned state of the art, the invention is based on the object of designing a hinge fitting of the kind presupposed as being known, such that the drawbacks of the known pertinent hinge fittings are avoided.

It is intended to provide a hinge fitting which has a smooth action even when the tolerances in the bearings are kept relatively small. Besides, it should be possible to adhere, with a relatively low manufacturing outlay, to such very small bearing clearance tolerances and to achieve a high degree of process reliability in the manufacture of the individual members and in the assembly.

SUMMARY OF THE INVENTION

In accordance with the present invention there is provided a hinge fitting for motor vehicle seats having an adjustable backrest, in which a fixed hinge member, which is associated with the seat, and a swivelling hinge member, which is associated with the backrest, are connected via an eccentric, and both hinge members are provided with sets of toothing, which engage each other and form part of a wobble mechanism, wherein the eccentric may be swivelled about a first swivelling axis in a first pivot bearing relative to one hinge member and about a second swivelling axis in a second pivot bearing relative to the other hinge member. Both pivot bearings are arranged eccentrically relative to each other and the pivot bearings are formed by plain bearing bushings which are mounted in the hinge members and/or the eccentric the running surfaces of which bushings observe, in each case, the shortest spacing from the associated axis of the hinge fitting which accommodates the respective plain bearing bushing, the plain bearing bushings being plastically compressible for calibration by means of a calibrating mandrel.

The design of the pivot bearings as plain bearing bushings, which are mounted in the hinge members, and their arrangement as well as their plastic compressibility have considerable advantages:

Already the use of plain bearing bushes, in conjunction with stamped sheet metal parts which can be manufactured economically, is advantageous. The arrangement of the plain bearing bushings in such a way that the larger plain bearing encircles the smaller plain bearing, in each case with a clearance, and a common plane extending through the plain bearing bushings and through the cooperating toothing, results in that cantings in the eccentric drive decreases. In addition, an only small axial overall width and a considerable internal stability of the hinge fitting are achieved, even against high forces which may arise during accidents.

The plain bearing or plain bearing bushings may be calibrated by means of a calibrating mandrel. This results, on the one hand, in the desired very narrow bearing tolerances with, at the same time, economical manufacture and, on the other hand, in achieving the desired high degree of operating reliability.

The plain bearing bushings may co-operate with unhardened associated sliding members. By dispensing with a hardening operation, errors resulting from distortions on hardening are prevented. In addition, the use of unhardened individual components increases the desired high degree of operating reliability.

The plain bearing bushings which are usually used are composed of a, preferably slotted, steel ring which takes up about 90% of the bearing volume. Onto this steel ring, a bronze layer, comprising about 9% of the bearing volume, is applied and a sliding layer of about 1% of PTFE (polytetrafluoroethylene) and lead is, in turn, applied onto said bronze layer. The non-steel volume of the plain bearing permits a calibration of the plain bearing within certain limits. After mounting and calibrating, a defined bearing diameter with a precision of a few thousandths of millimeters is ensured. When the calibrating mandrel has been driven through the bearing, in the course of the fully automatic assembling operation, it is thus ensured that a minimum dimension, which is required for production, is provided. It is then also possible to mount the eccentric with the desired minimum bearing clearance and to turn it readily. The fact that the bearings may be calibrated permits an increase in the precision during the manufacturing process, and this may be exploited to reduce the play and, at the same time, to increase the operating reliability.

A subsequent precision increase of the bearings during the assembly operation is not known in the relevant state of the art for hinge fittings. Indeed, in the state of the art, the precision of the bearings was heretofore exclusively determined by the precision of the bearings themselves which were used and the associated bearing seats. The precision of the calibrated bearings has the result that the actuating moment of the fitting is smaller than that which would be required for ergonomic reasons. The result hereof is a reserve which may be used for a braking moment, which is to be provided artificially, with the aid of an installed friction brake.

Preferred embodiments of the present invention are set out in detail in the following description of the drawings.

DETAILED DESCRIPTION OF VARIOUS AND PREFERRED EMBODIMENTS OF THE INVENTION

Figure 1:
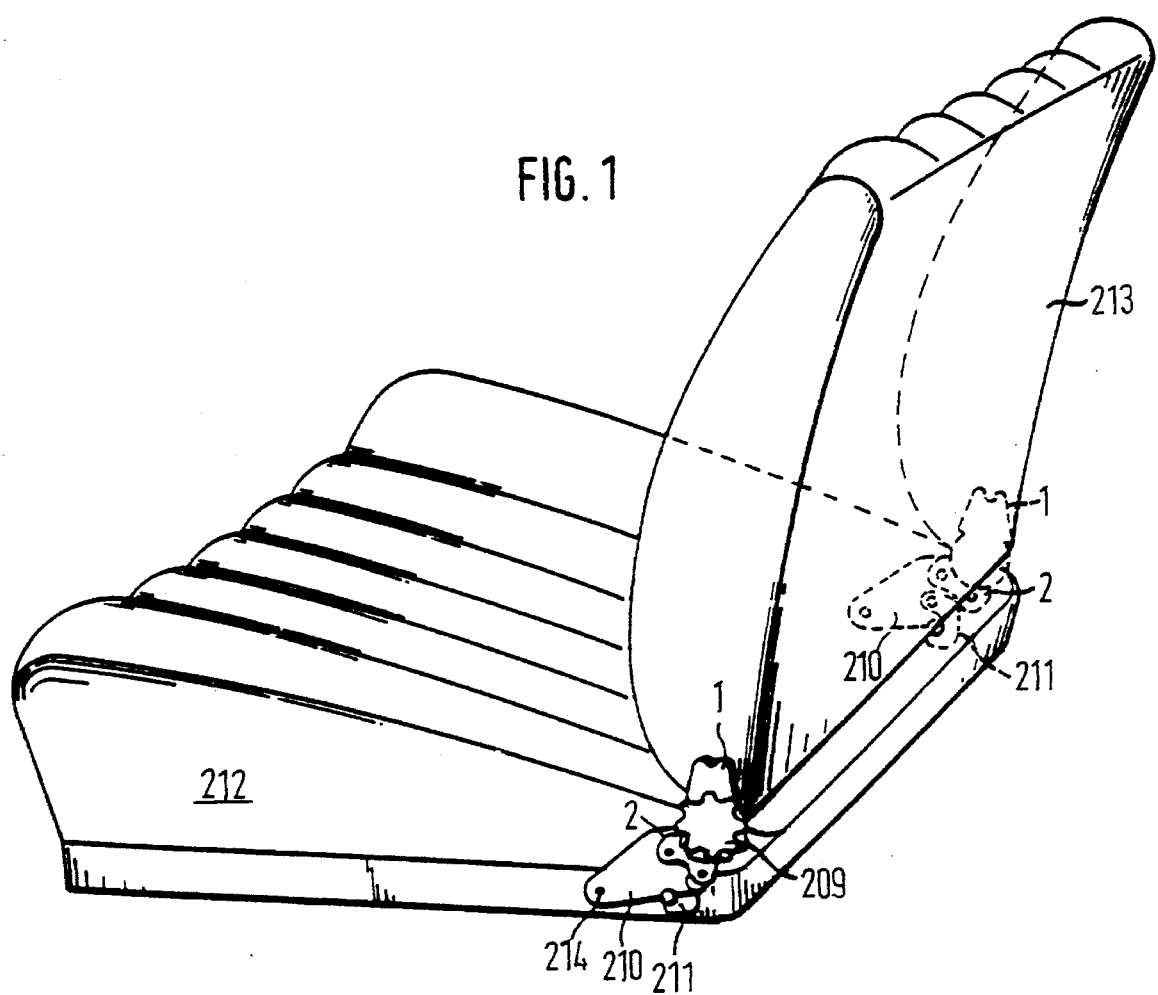
FIG. 1 shows a diagrammatic perspective view of a motor vehicle seat with a diagrammatic illustration of a hinge fitting.

In the Figures of the drawing, identical or corresponding parts bear the same reference numbers or reference numbers which are distinguished by the number of apostrophes or by a numeral which is greater by 100.

In the embodiments according to FIGS. 1 to 4, a hinge member 2 is connected to the seat 212 of the motor vehicle seat, while a hinge member 1 is connected to the backrest 213 of the motor vehicle seat. In the case of the embodiments according to FIGS. 5 to 12, the hinge member which is firmly connected to the seat is designated by reference number 102, and the hinge member which is connected to the backrest 213 is designated by reference number 101. The seat-fixed hinge member 2 or 102 is firmly secured to a hinge member 210 which can swivel about the swivelling axis 214, in order to tilt the backrest 213 forward. The backrest 213 is locked in position by means of a latch 211.

The handwheel 209 serves to rotate the eccentric.

The relevant design of the hinge fitting is more clearly visible in the various cross-sectional drawings.

Figure 2:
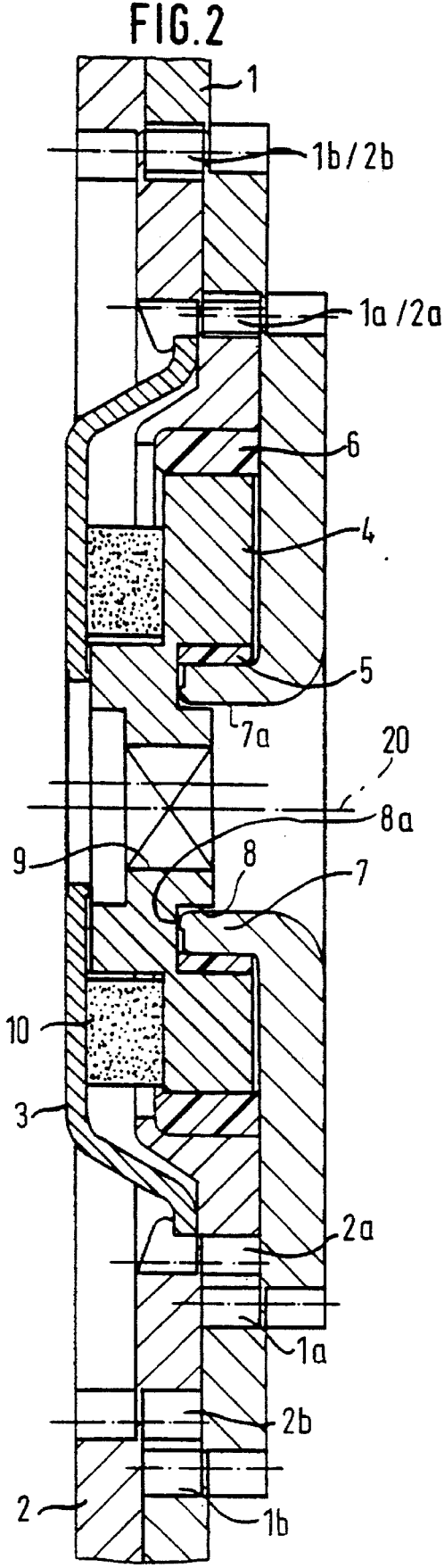
FIG. 2 shows a cross-section of a first embodiment of a hinge fitting.
Figure 3:
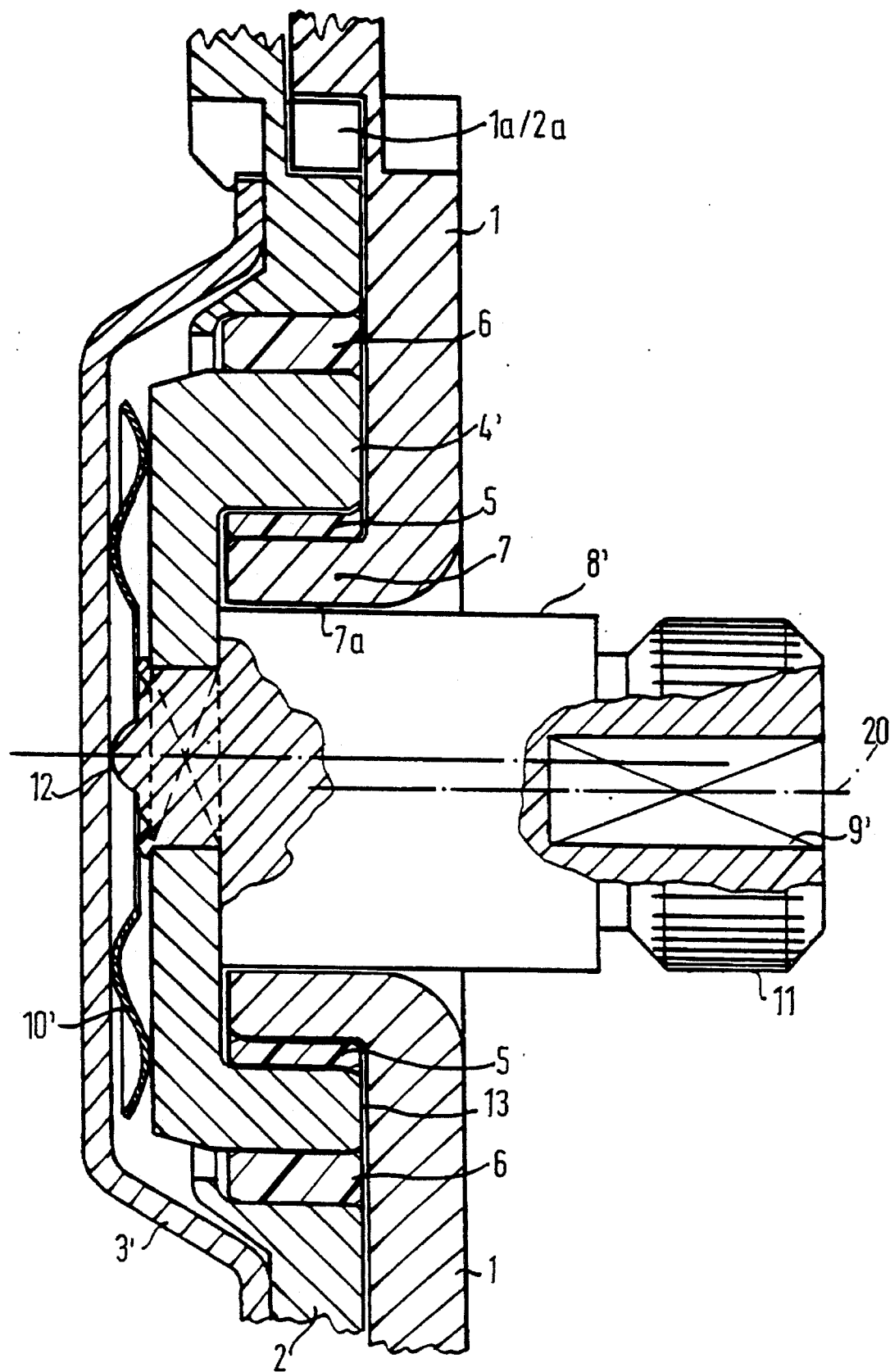
FIG. 3 shows a cross-section of a second embodiment of a hinge fitting.
Figure 4:
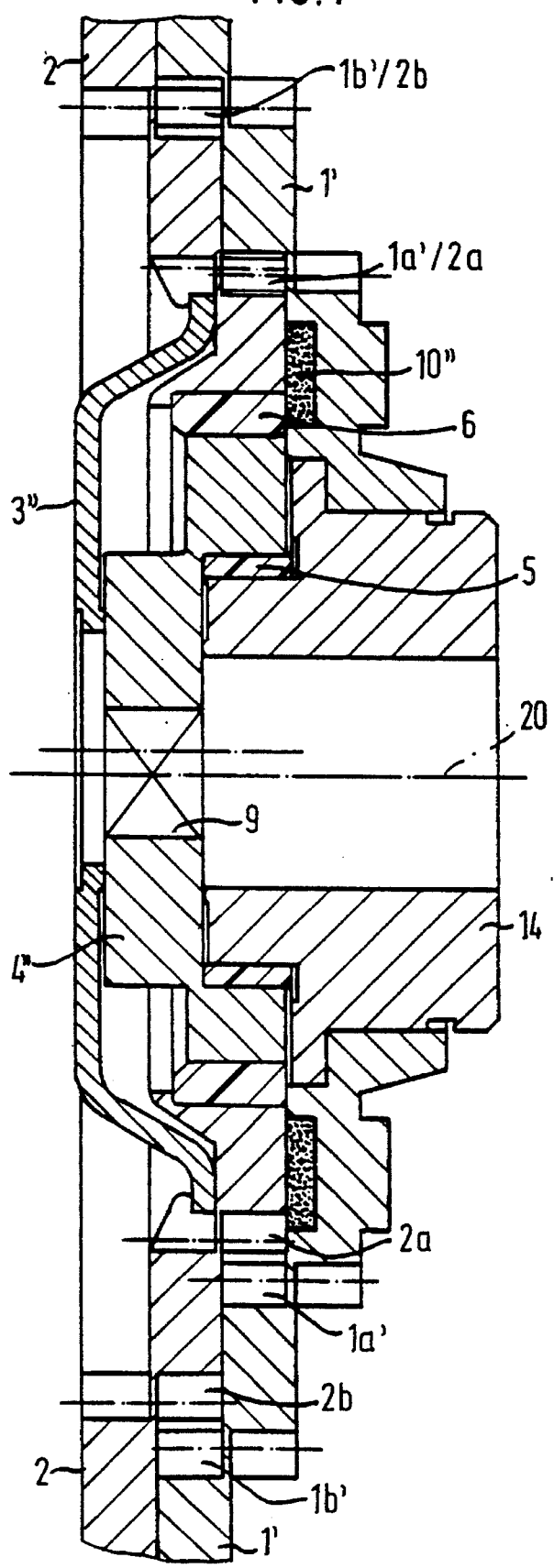
FIG. 4 shows a cross-section of a third embodiment of a hinge fitting.
Figure 5:
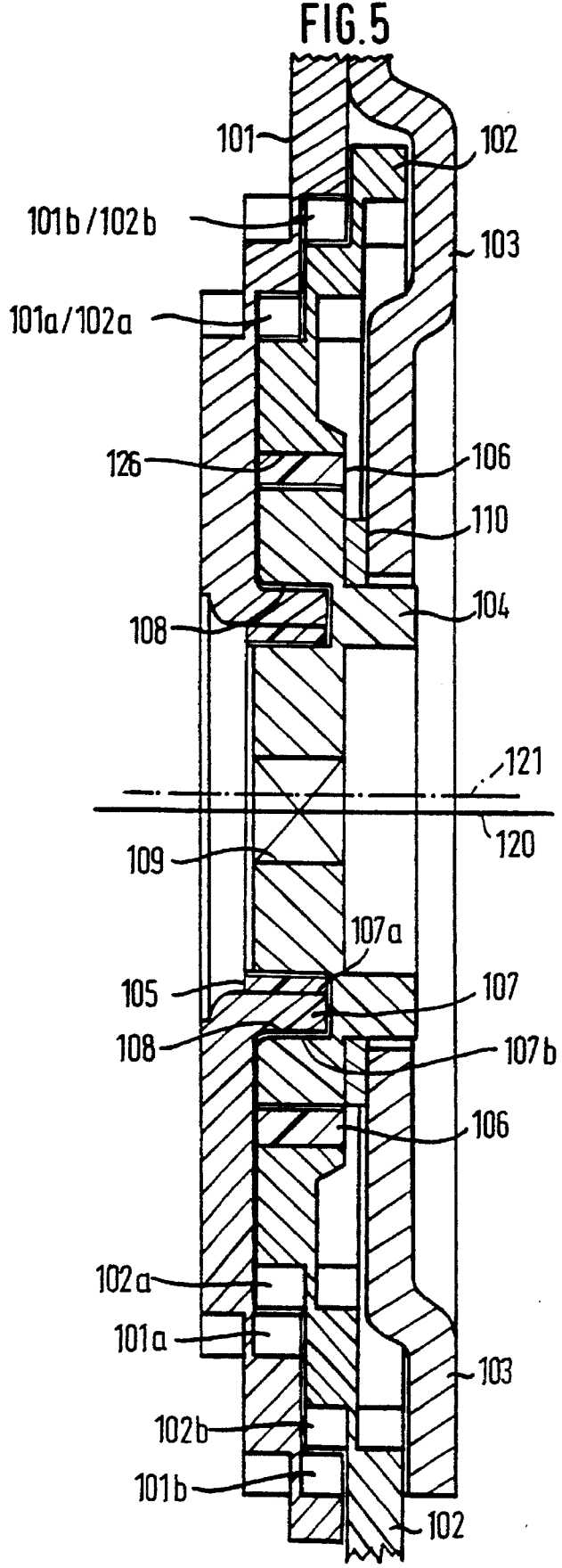
FIG. 5 shows a cross-section of a fourth embodiment of a hinge fitting.

Referring, firstly to the embodiment shown in FIGS. 2–4, it can be seen that both hinge members 1 and 2, in each case, comprise two sets of toothing which, in each case, are arranged to be staggered. The hinge member 1 comprises the staggered rows 1a and 1b of teeth, the row 1a of teeth having a smaller reference diameter than the row 1b of teeth. The hinge member 2 is provided with correspondingly staggered toothing with differing reference diameters which are designated by the reference numbers 2a and 2b.

In the illustrated exemplified embodiments 2 to 4, the rows 1a and 1b of teeth engage in the upper region with the rows 2a and 2b of teeth, whereas they do not engage in the lower region. The rows of teeth which are in a working connection form the toothed part of a wobble mechanism which is known in hinge fittings for motor vehicle seats.

The hinge member 1 comprises a bearer 7, together with a bearer bore 7a. A plain bearing bushing 5, which extends concentrically relative to the bearer bore 7a and relative to the swivelling axis 20, is provided on the outer edge of the bearer 7.

An eccentric 4 is supported for rotation on the plain bearing bushing 5, the rotation of which eccentric is carried out via a central square by means of a drive shaft which is not illustrated.

The eccentric 4, in turn, abuts on all sides with its outer eccentric surfaces on a plain bearing bushing 6 which is secured in the hinge member 2. The plain bearing bushings 5 and 6 are offset eccentrically relative to each other. The arrangement of the plain bearing bushings 5 and 6 is selected such that not only the plain bearing bushings but also the rows 1a or 1b of teeth are disposed in the region of a common plane which extends perpendicularly relative to the axis of rotation 20.

A bowl-like locking plate 3, which serves as a stop member, is attached to the hinge member 2. A brake disc 10 is arranged between the inwardly directed flat side of the locking plate 3 and an opposite, parallel-extending shouldered region of the eccentric 4. The eccentric 4 is pressed in the axial direction against the circumferential rib 7b of the bearer 7, by the brake disc 10. In a rotation of the hinge members relative to each other, which is brought about by the drive of the eccentric 4, the flat end faces of the brake disc 10 become operative.

The eccentric comprises a wave-like region 8a which is guided with a clearance in the bearer bore 7a. This construction permits a very flat design.

In the embodiment according to FIG. 3, the fundamental design of the hinge members 1 and 2, the rows 1a and 2a of teeth, the plain bearing bushings 5 and 6, is virtually identical to that of the first embodiment. A difference lies, primarily, in the design of the eccentric 4', which comprises a wave-like region 8a. At the end of this wave-like region 8a, toothing 11 is provided, as is a square socket 9'. The drive of the wave-like region 8' may be provided by a drive motor or by hand.

The wave-like region 8' is supported in the bearer bore 7a. The wave-like region is form-lockingly connected to the eccentric region 4' via a square. The eccentric region 4' extends, with its outer surface, in the plain bearing 6 and, with its inner surface, in the plain bearing 5. At its end face, the wave-like region 8' of the eccentric is provided with a spherical projection 12 which abuts against the bowl-shaped locking plate 3' which is firmly connected to the hinge member 2. A wave-shaped disc 10', which serves as a brake disc, is provided between that end face of the eccentric 4' which faces the locking plate 3' and the inner side of the locking plate 3'. The brake disc 10' presses the end face 13 of the eccentric 4' against the hinge member 1.

The embodiment according to FIG. 4 essentially corresponds to the embodiment according to FIG. 2. The differences reside, primarily, in the design of the eccentric, the design of the hinge member 1' and the arrangement of the brake disc 10".

The hinge member 1' comprises a fixed hub region 14. The eccentric 4" is supported inwardly on a plain bearing 5 which is concentric with the axis of rotation 20. The eccentric outer region of the eccentric 4" runs in the plain bearing 6 which is secured in the hinge member 2.

A locking plate 3" which is fixed to the hinge member 2, presses the eccentric 4" with its end face, in the direction of the brake disc 10". The drive of the eccentric is provided in the same manner as in the case of the embodiment according to FIG. 2, via a square socket 9 in the eccentric 4".

With reference to FIGS. 5 to 12 the hinge fitting shown comprises two hinge members 101 and 102. The hinge member 102 is connected to the stationary seat of the motor vehicle seat, while the hinge member 101 is firmly connected to the tilting backrest of the motor vehicle seat.

Both hinge members comprise, in each case, two sets of toothing which are, in each case, arranged to be staggered. The hinge member 101 comprises the staggered rows of teeth 101a of teeth 101b the row of teeth 101a having a smaller reference diameter than the row of teeth 101b. The hinge member 102 is provided with corresponding staggered toothings which have differing reference diameters and are designated by reference numbers 102a and 102b.

In the exemplified embodiments illustrated, the rows of teeth engage 101a and 101b, in the upper region, with the rows of teeth engage 102a and 102b, while they do not engage in the lower region. The rows of teeth which are in a working connection form the toothed part of a wobble mechanism which is known in hinge fittings for motor vehicle seats.

The hinge member 101 comprises a collar or bearer 107, together with a bearer bore 107a. A plain bearing bushing 105, which extends concentrically relative to the bearer bore 107a and relative to the axis of rotation 120 of the movable hinge member 101, is mounted in the bearer bore 107a. The collar 107 has an outside diameter 107b.

An eccentric 104, which is designed to be substantially disc-shaped, is mounted for rotation in the plain bearing bushing 105. The rotation of the eccentric is carried out via a central square bore 109 by means of a drive shaft, which is not illustrated. The eccentric 104, in turn, is supported on all sides with its outer eccentric surface in a plain bearing bushing 106 which is supported in a centre bore 126 of the hinge member 102. The plain bearing bushing 105 and 106 are offset eccentrically relative to each other. The arrangement of the plain bearing bushes 105 and 106 is selected such that not only the plain bearing bushings but also the rows 1a or 1b of teeth are disposed in the region of a common plane which extends perpendicularly relative to the axis of rotation 20.

Reference number 121 designates the axis of the centre bore 126 or of the plain bearing bushing 106, respectively.

An end plate 103 is secured to the hinge member 101. An annular brake disc 110 is arranged between the flat inner surface of the end plate 103 and the opposite flat region of the eccentric 104. Reference number 108 designates a cylindrical region of the eccentric 104, which region surrounds, with a small clearance, the outside diameter of the collar 107. The central axis of the cylindrical region 108 coincides with the axis of rotation 120.

Figure 6:
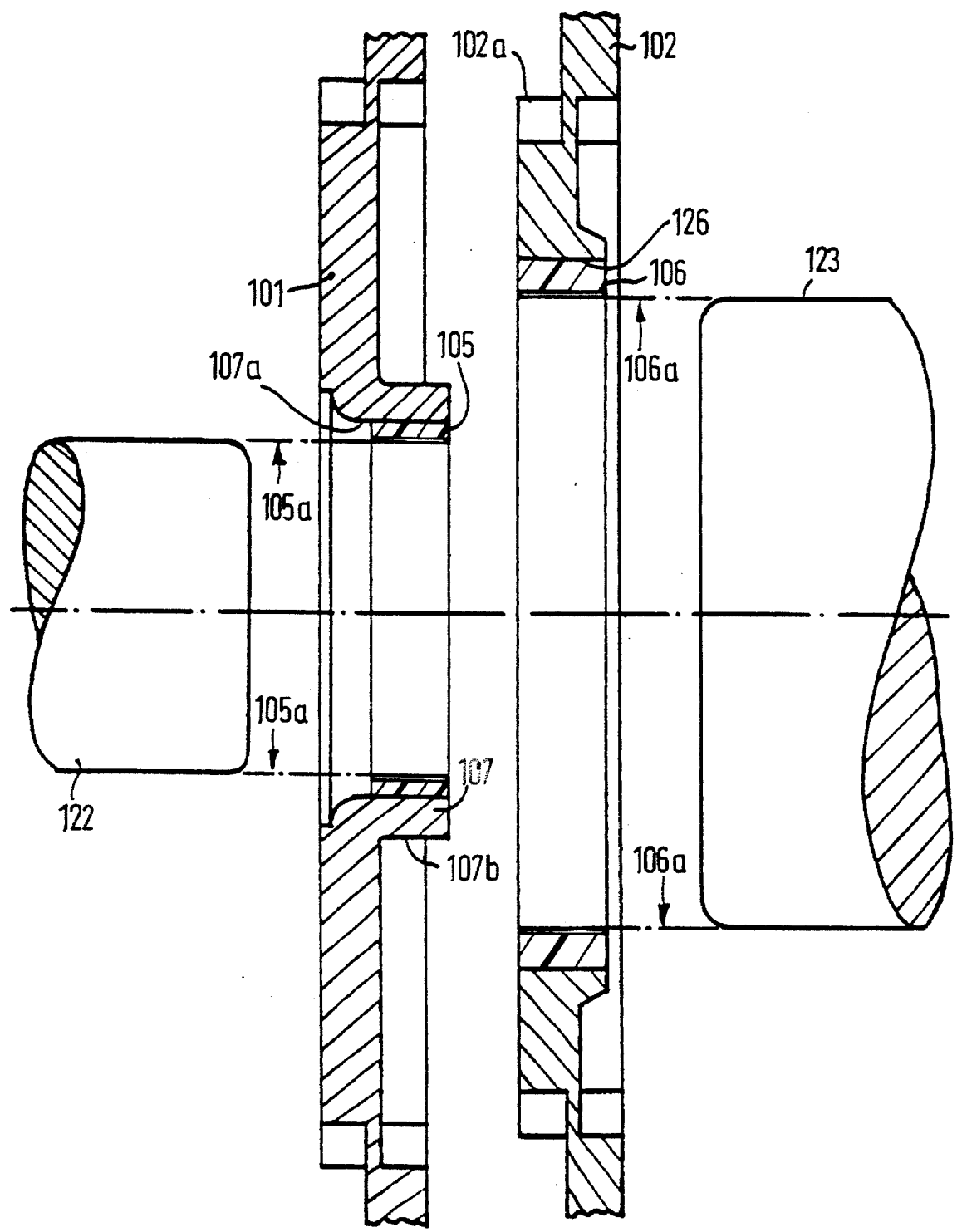
FIG. 6 shows partial regions of the first and second hinge member in section, with indicated calibrating mandrels.

In the drawing FIG. 6, the two hinge members 101 and 102 are illustrated individually, calibrating mandrels 122 and 123 also being shown. The plain bearing bushing 106 is mounted in the centre bore 126 of the hinge member 102 and is then calibrated by the calibrating mandrel 123. The calibration of the small plain bearing bush 105 is carried out in a corresponding manner, said bush first being mounted in the bearer bore 107a before it is calibrated by the calibrating mandrel 122. Assembling apparatus is available, by means of which the mounting and subsequent calibrating of the plain bearing bushes 105 and 106 are carried out in a single working step.

Figure 7:
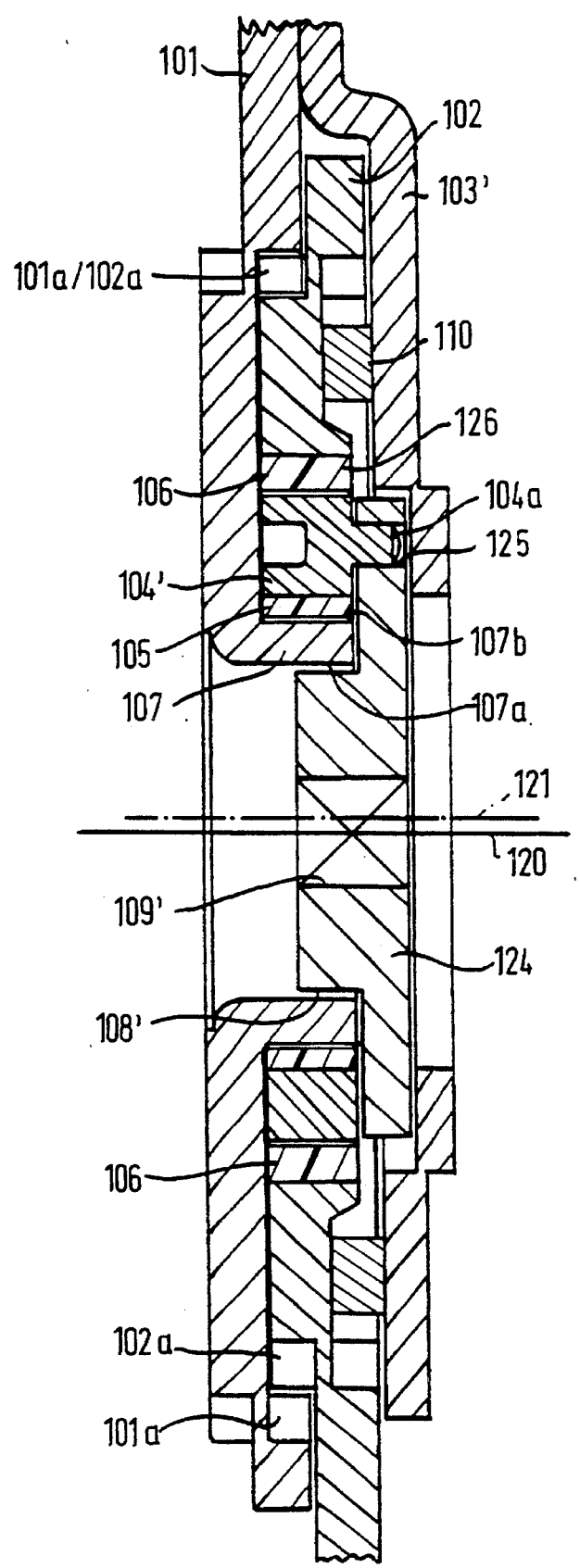
FIG. 7 shows a fifth embodiment which is analogous to the illustration of FIG. 5.

In the case of the embodiment according to FIG. 7, the hinge members in each case have only one row of teeth and the eccentric 104' is designed, in this instance, to be annular. The opposing surface for the small plain bearing bushing 105 is, in this case, the outside diameter 107b of the collar 107. The annular eccentric 104' may be manufactured as a precision-stamped part or as a sintered product. It is provided with driving pins 104a which engage in corresponding bores 125 of a carrier 124. The drive is, in this instance, provided via a connecting rod, which is not illustrated, via the square 109' in the carrier 124.

Figure 8:
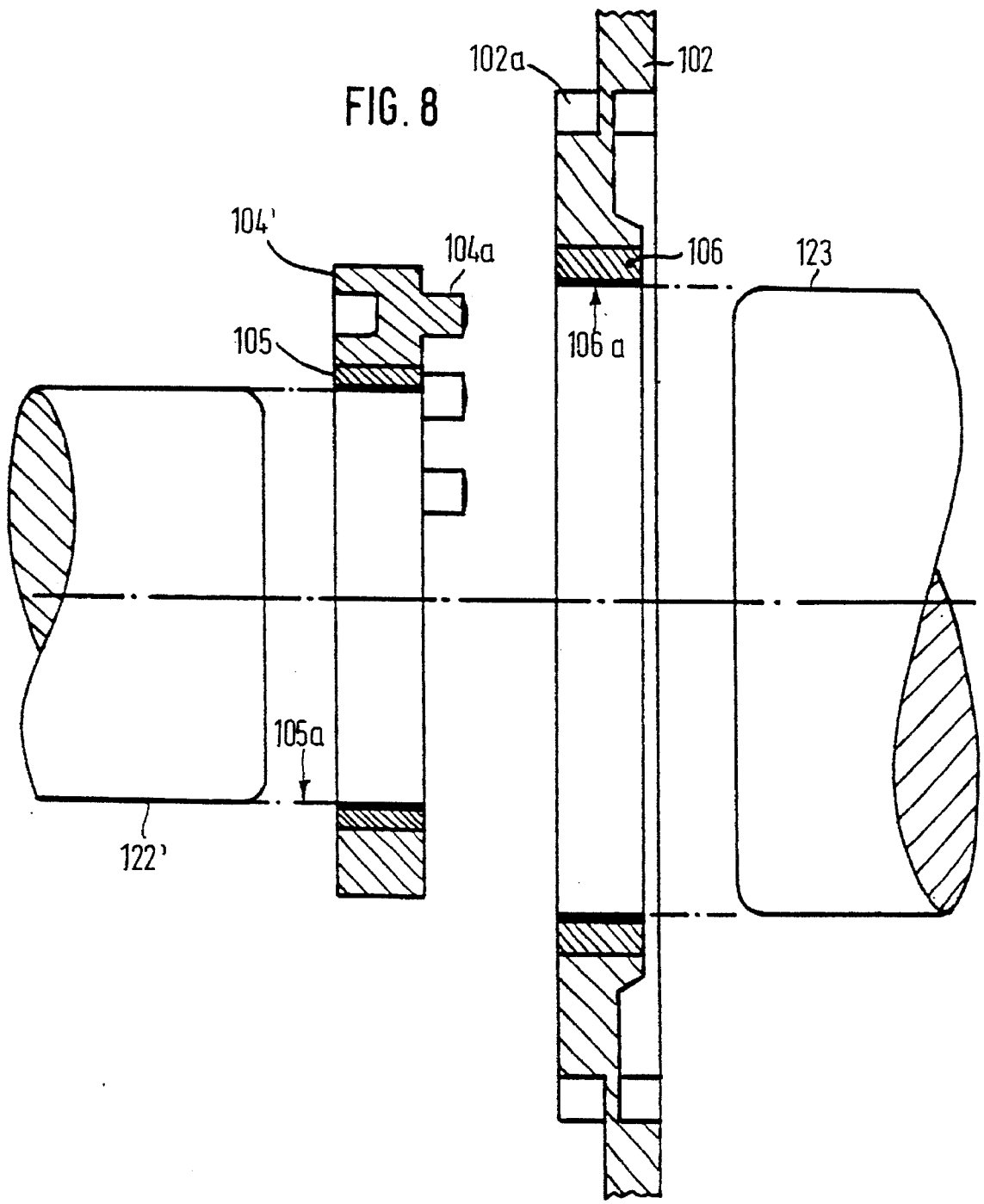
FIG. 8 shows partial regions of two hinge members in section, with two calibrating mandrels, in a representation analogous to FIG. 6.

The drawing FIG. 8 shows the eccentric ring 104' with the associated calibrating mandrel 122' and the hinge member 102, together with the mounted plain bearing 106 and the calibrating mandrel 123 which is provided. By means of the calibrating mandrel 122', a calibrated bearing diameter 105a is produced, and by means of the calibrating mandrel 123, a calibrated bearing diameter 106a of the plain bearing 106.

Figure 9:
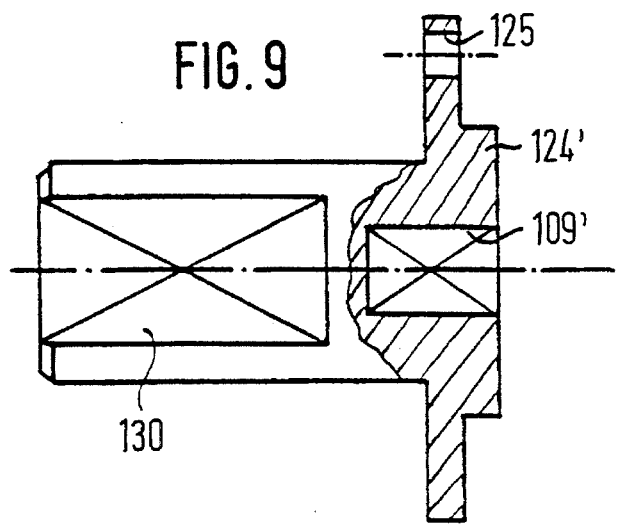
FIG. 9 shows a partially sectioned alternative embodiment of a carrier for the eccentric according to FIG. 7.
Figure 10:
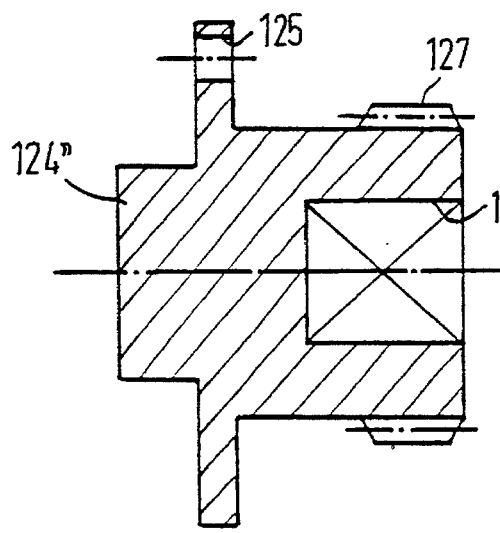
FIG. 10 shows a further embodiment of a carrier for an electric drive.
Figure 11:
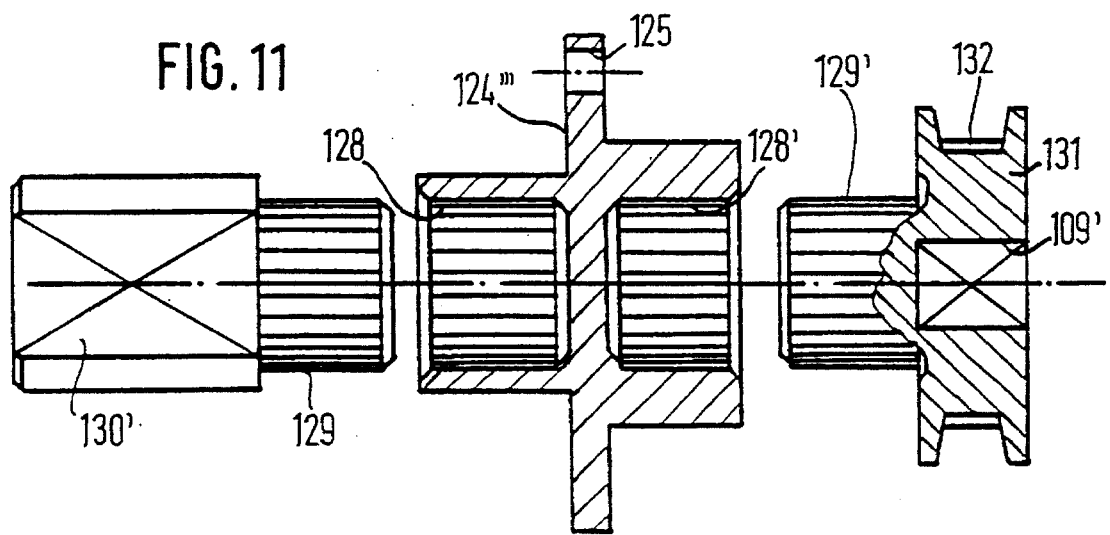
FIG. 11 shows a further embodiment of a carrier, which may optionally be equipped for an electric drive or for a handwheel drive.

FIGS. 9 to 11 show different designs of carriers 124', 124" and 124'", which co-operate with the eccentric ring 104'.

Figure 12:
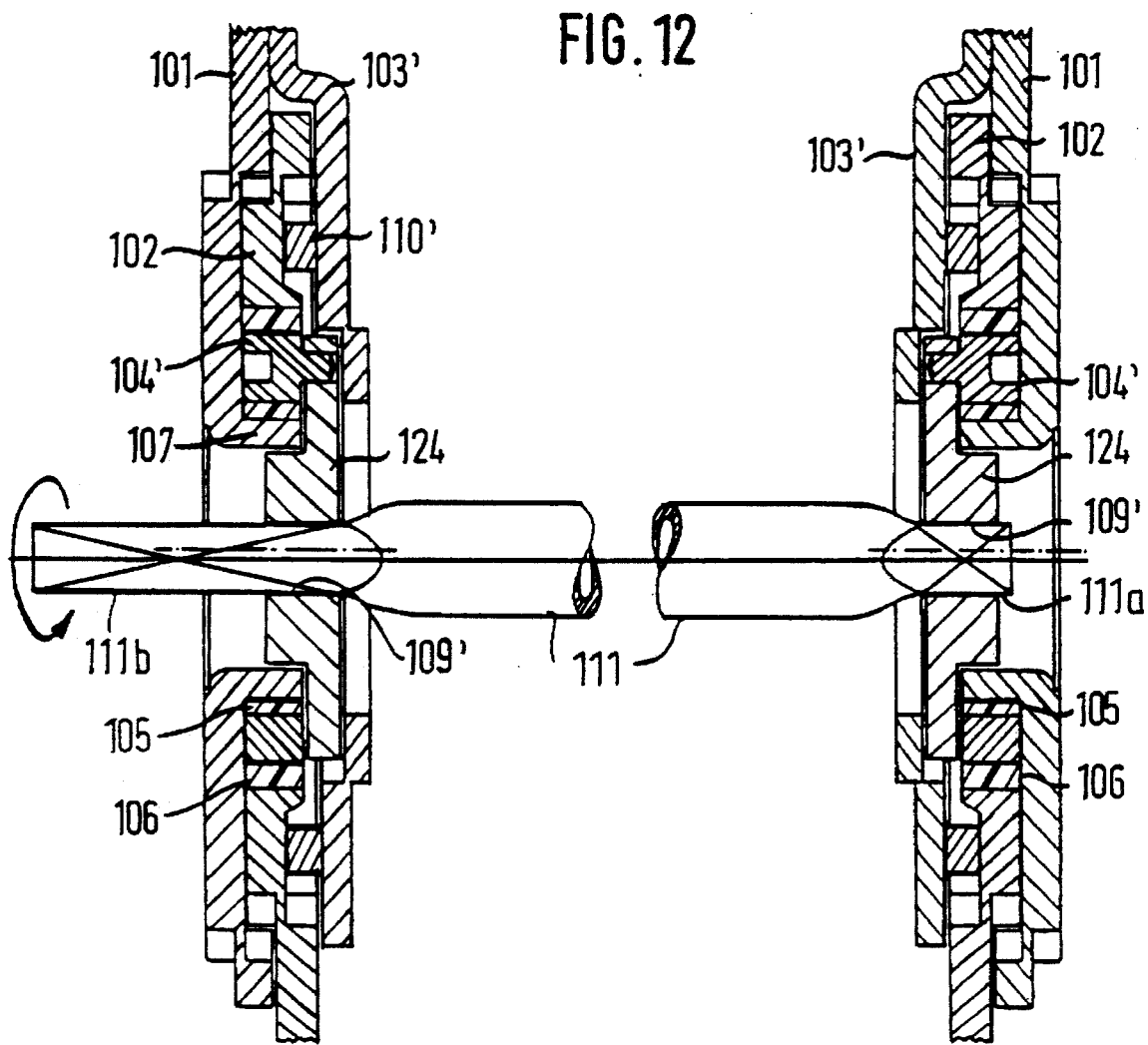
FIG. 12 is an illustration of two hinge fittings which are provided on the same seat and are turned jointly via a connecting rod.

In its various forms, the carrier may be designed to vary greatly, for example, as a die-cast zinc part or even as a plastics part. In the embodiment according to FIG. 9, a carrier 124'" is shown, which is inwardly provided with the square bore 109' to receive a connecting rod 111 (see FIG. 12). In addition, it is provided with a levelling 130, for connection to a handwheel. The corresponding fitting on the other side of the backrest is merely provided with a simple carrier 124, such as is shown in FIG. 12.

FIG. 10 shows a carrier 124" which, for an electric drive, comprises a toothing 127 in which a pinion of a geared motor can engage. In addition, a square socket bore 109" is provided to accommodate a connecting rod 111.

In the embodiment according to FIG. 11, a carrier 124'" is illustrated which may be assembled differently. It is provided, on both sides, with receiving bores having a multispline profile 128 and 128'. Various structural components may be pressed therein or secured in any other manner, for example, by means of clips. Thus, for example, on the left-hand side a handwheel support 130' comprising a multispline journal 29 is illustrated and, on the right-hand side, a toothed belt hub 131 comprising a toothed profile 132. The drive may be provided via the toothed profile 132, by means of a toothed belt, by means of a handwheel which is arranged to be offset.

The design according to FIG. 11 permits that the fitting comprising the integrated carrier 124''' may be equipped, after assembly, to meet the widest range of customer requirements. It is sufficient to manufacture a single standard fitting.

Finally, in FIG. 12, a right-hand and a left-hand embodiment of a fitting are illustrated. Each of the backrest struts, which are not illustrated, is connected to the movable hinge member 101 of a fitting. A connecting rod 111 is supported in the square bores 109 of the eccentrics 104, or in the square bores 109' of the carrier 124. The left-hand square 111*b* is designed to be longer, such that the handwheel used for adjusting may be attached thereto. By means of the connecting rod 111, it is ensured that the adjusting operation is carried out synchronously in both fittings, thus tilting the backrest completely uniformly.

I claim:

1. A hinge fitting for motor vehicle seats having an adjustable backrest, said hinge fitting comprising:

a fixed hinge member, which is associated with the seat;

a swivelling hinge member, which is associated with the backrest;

an eccentric connecting said fixed hinge member and said swivelling hinge member, at least a portion of said eccentric being arranged between a surface of the fixed hinge member and a surface of the swivelling hinge member;

interengaging sets of teeth provided on both hinge members, said teeth forming part of a wobble mechanism;

a first inner pivot bearing mounted between an inner surface of said eccentric and a surface of one of said hinges;

a second outer pivot bearing mounted between an outer surface of said eccentric and a surface of the other of said hinges;

said pivot bearings being formed by plain bearing bushings arranged eccentrically relative to each other;

a running surface of at least one of said pivot bearings is located at a most central place of the associated hinge;

wherein the eccentric may be swivelled about a first swivelling axis in said first pivot bearing relative to one of said hinge members and about a second swivelling axis in said second pivot bearing relative to the other of said hinge members; and the plain bearing bushings being plastically compressible for calibration by calibrating mandrel means.

2. A hinge fitting according to claim 1, wherein about 10% of the volume of the pivot bearings is plastically compressible.

3. A hinge fitting according to claim 1, wherein a common plane extends through the pivot bearings and the [co-operating interengaging sets of teeth.

4. A hinge fitting according to claim 1, wherein said first inner pivot bearing is supported within a collar of a bearer bore of one of said hinge members.

5. A hinge fitting according to claim 1, wherein the pivot bearings include running surfaces which co-operate with unhardened sliding bearing surfaces of the hinge members.

6. A hinge fitting according to claim 1, further comprising a friction brake for substantially immobilizing said hinge fitting, said friction brake including a surface which engages a surface of at least one of said hinge members, the eccentric, said teeth, or one of said pivot bearings.

7. A hinge fitting according to claim 6, wherein the friction brake is a disc brake.

8. A hinge fitting according to claim 6, wherein a surface of the friction brake abuts, on the one hand, against one of said hinge members and another surface of said friction brake abuts against the other of said hinge members or against another element of said hinge fitting which abuts the other of said hinge members.

9. A hinge fitting according to claim 6, wherein a surface of the friction brake abuts against one of said hinge members or against a element of said hinge fitting which abuts one of said hinge members member and another surface of said friction brake abuts against the eccentric.

10. A hinge fitting according to claim 1, wherein an outside diameter of the eccentric runs on a running surface of the second outer pivot bearing and wherein a further outside diameter, which is formed in an inner region of the eccentric, runs on a running surface of the first inner bearing pivot.

11. A hinge fitting according to claim 1, wherein a cylindrical region is provided on the eccentric; the central axis of the cylindrical region coincides with one of said swivelling axes; one of said hinge members, which the eccentric swivels relative to when the eccentric swivels about said one of said swivelling axes, surrounds the cylindrical region; a bore is formed on said one hinge member such that said cylindrical region engages, with a small clearance, said bore.

* * * * *